L. BETHKE.
CAST LINK PROVIDED WITH ANTIFRICTION ROLLER AND PROCESS OF MAKING SAME.
APPLICATION FILED MAR. 16, 1919.
1,379,896.
Patented May 31, 1921.
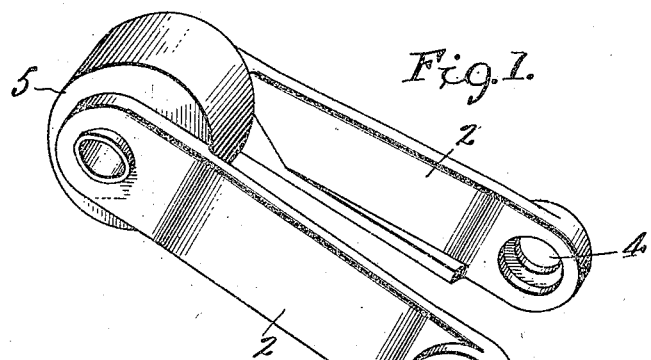
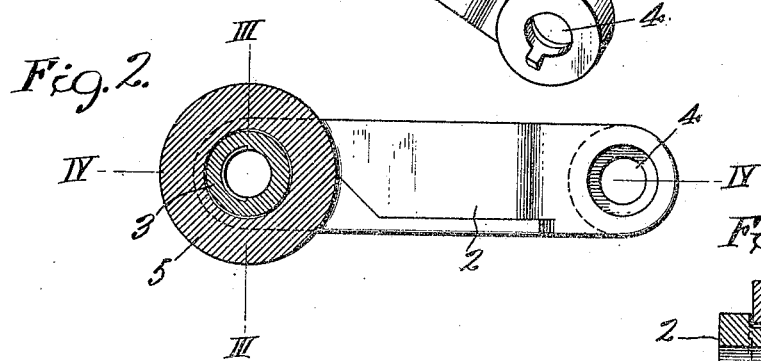
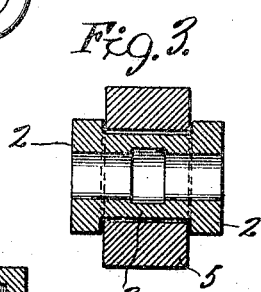
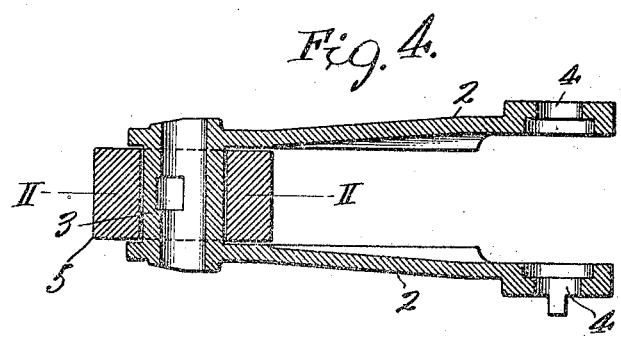
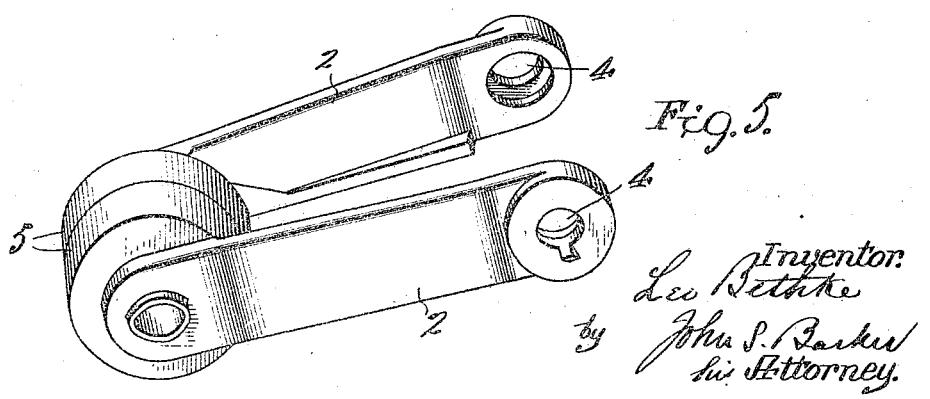

UNITED STATES PATENT OFFICE.

LEO BETHKE, OF MILWAUKEE, WISCONSIN, ASSIGNOR TO CHAIN BELT COMPANY, OF MILWAUKEE, WISCONSIN, A CORPORATION OF WISCONSIN.

CAST LINK PROVIDED WITH ANTIFRICTION-ROLLERS AND PROCESS OF MAKING SAME.

1,379,896.     Specification of Letters Patent.     Patented May 31, 1921.

Application filed March 10, 1919. Serial No. 281,805.

*To all whom it may concern:*

Be it known that I, LEO BETHKE, a citizen of the United States, residing at Milwaukee, in the county of Milwaukee and State of Wisconsin, have invented certain new and useful Improvements in Cast Links Provided with Antifriction-Rollers and Processes of Making the Same, of which the following is a specification.

My invention relates to chains such as are employed for power transmitting and conveying purposes and are adapted to engage with sprocket wheels, and have anti-friction wheels or rollers supported upon their cross members. The invention has for its object to produce integral cast metal links for a chain of this type with the rollers that the links carry also integral, and inseparably united with the links, though free to turn relative thereto.

In the accompanying drawings Figure 1 is a perspective view of a link embodying my invention, having a single anti-friction roller; Fig. 2 is a central longitudinal section thereof;

Fig. 3 is a transverse sectional view taken on the line III—III of Fig. 2.

Fig. 4 is a longitudinal sectional view on the line IV—IV of Fig. 2; and

Fig. 5 is a perspective view of a chain link provided with a pair of rollers.

The chain links shown, in their general features, are of well known form but may be widely varied in details as to shape, size and proportions. Each link consists of a pair of side bars 2, connected by a cross-bar 3, which is preferably perforated in order that links may be united to form a chain, by means of pintles passed through the perforated cross bars and through the perforations 4 in the free ends of the side bars. This type of chain is so well known as not to need further illustration or description. The link proper is cast integral, that is the side bars and cross-bar are of one piece of metal. Upon the cross-bar and between the side bars is a roller 5, likewise integral and undivided, and free to turn upon the cross-bar. A pair of rollers may be used instead of one, the resulting product being then a link like that represented in Fig. 5.

In the manufacture of a link such as described the rollers are first formed. One of these is then inserted in each mold for a link, becoming a part of the mold and serving as a chill for the crossbar of the link.

Among the advantages incident to a link such as described may be noted the following: Each link, including the anti-friction roller thereof, may be handled as a unit thus facilitating assembly of the links into a chain and reducing the number of operations required both in the assembly and subsequent alterations and repairs of the chain. Chain links, of the type to which mine belongs and having the features thereof that have been described, as heretofore constructed, usually consist of three parts, two side bars each carrying part of the crossbar, and an anti-friction roller. These have to be separately handled in assembling and preparing the chain. By making the parts of the chain integral the life thereof is prolonged, since wear incident to movements between parts is eliminated, with incident saving and greater smoothness in operation. By making the parts of the link proper integral and having the roller inseparably united therewith the possibility of variation in pitch between the two side bars of the link is eliminated while the roller does not bind, but runs freely throughout the life of the link, the relationship of the parts of the chain being maintained so long as the link exists, due to the construction described. By using one of the parts as a chill for the other in the manufacture of the link, better wearing surfaces between the roller and the link proper are produced and the wearing qualities of the chain are increased.

Having described my invention what I claim is:

1. A one-piece link for a sprocket, conveying and power transmitting chain, having a cross bar and a pair of side bars, and a loose, freely turning, integral and undivided roller on the cross bar, and inseparable therefrom without destroying the link.

2. A unitary link for power chains with side bars and a hollow crossbar on which latter is a free turning, unitary, undivided roller.

3. The herein described process of making one-piece, cast metal links for conveying and power transmitting sprocket chains, each link having a pair of side bars and a connecting crossbar and an anti-friction roller on the crossbar, which consists in forming one-piece rollers, placing in each mold for a link one of such rollers so that it may serve as a chill for the crossbar of the link, and then casting the link in said mold so that on completion of the casting operation the finished article consists of a unitary link on the crossbar of which is a unitary, free-turning roller.

LEO BETHKE.